United States Patent [19]
Lin et al.

[11] Patent Number: 6,028,914
[45] Date of Patent: Feb. 22, 2000

[54] SYSTEM AND METHOD FOR MONITORING PERFORMANCE STATISTICS IN A COMMUNICATIONS NETWORK

[75] Inventors: Lisan Lin, Carrollton; Balaji Ratakonda, Plano; Timothy K. Patterson; Gaurang Kalyanpur, both of Allen, all of Tex.

[73] Assignee: INET Technologies, Inc., Plano, Tex.

[21] Appl. No.: 09/057,940

[22] Filed: Apr. 9, 1998

[51] Int. Cl.[7] .......................... H04M 1/24; H04M 15/00; H04M 3/24

[52] U.S. Cl. .......................... 379/14; 379/133; 379/207; 379/113

[58] Field of Search .................................. 379/9, 10, 14, 379/15, 32, 34, 113, 133, 134, 136, 207

[56] References Cited

U.S. PATENT DOCUMENTS

| | | | |
|---|---|---|---|
| 5,438,570 | 8/1995 | Karras et al. | 370/94.2 |
| 5,592,530 | 1/1997 | Brockman et al. | 379/34 |
| 5,703,939 | 12/1997 | Busnell | 379/113 |
| 5,712,908 | 1/1998 | Brinkman et al. | 379/119 |
| 5,825,769 | 10/1998 | O'Reilly et al. | 379/207 |
| 5,828,729 | 10/1998 | Clermont et al. | 379/34 |
| 5,867,558 | 2/1999 | Swanson | 379/34 |
| 5,883,948 | 3/1999 | Dunn | 379/34 |

OTHER PUBLICATIONS

Bell Communications Research Inc. –Local Number Portability –Seminar (LNP–IS) –1996.

*Primary Examiner*—Paul Loomis
*Attorney, Agent, or Firm*—Fulbright & Jaworski L.L.P.

[57] ABSTRACT

A system is provided for monitoring the operation of switching nodes in a telephone network. A first monitor is provided which is operable to capture data on all of the connection links of a first switching node in the network. A second monitor is provided which is operable to capture data on all of the connection links of a second switching node. The first and second monitors capture selected telephone switching messages on the links of the nodes. Each monitor compiles either a primary or secondary record of switching messages pertaining to a particular call or transaction being routed by switching nodes. The primary record is maintained by the monitor which detects the first message which initiates a particular call or transaction. Subsequent messages pertaining to that call or transaction that are captured by the other monitor are compiled in a secondary record. During the call or at the completion of the call or transaction, selected messages stored in the secondary call record are transferred to the monitor containing the primary record by means of a communications bus connecting the two monitors. The composite record is then analyzed by the monitor containing the primary record to evaluate the performance of the telephone switch and to generate performance statistics for the network.

53 Claims, 5 Drawing Sheets

| TID x | | |
|---|---|---|
| CALLER | SP1 | -- |
| SP1 | LSTP | M1 |
| LSTP | RSTP | M1, M2 |
| RSTP | SCP1 | M2 |

| TID y | | |
|---|---|---|
| SCP1 | RSTP | M2 |
| RSTP | LSTP | M1, M2 |
| LSTP | STP | M1, M3 |
| STP | SCP2 | M3 |
| SCP2 | STP | M3 |
| STP | LSTP | M1, M3 |
| LSTP | RSTP | M1, M2 |
| RSTP | SCP3 | M2 |
| SCP3 | RSTP | M2 |
| RSTP | SCP1 | M2 |

| TID x | | |
|---|---|---|
| SCP1 | RSTP | M2 |
| RSTP | LSTP | M1, M2 |
| LSTP | SP1 | M1 |
| SP1 | CALLED PARTY | -- |

| TID x | | |
|---|---|---|
| SP1 | LSTP | M1 |
| LSTP | SP2 | M1 |
| SP2 | CALLED PARTY | -- |

FIG. 9D

| TID x | | |
|---|---|---|
| SP1 | LSTP | M1 |
| LSTP | STP | M1, M3 |
| STP | SP3 | M3 |
| SP3 | CALLED PARTY | -- |

SYSTEM AND METHOD FOR MONITORING PERFORMANCE STATISTICS IN A COMMUNICATIONS NETWORK

TECHNICAL FIELD OF THE INVENTION

The present invention relates in general to testing and monitoring systems that are arranged to capture the data that flows between nodes of a communications network, and, more particularly, to monitoring systems that are adapted to correlate data in a signaling network in order to generate performance statistics.

BACKGROUND OF THE INVENTION

Common channel signaling networks, such as the Signaling System 7 (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs.

When any transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away.

Automated monitoring equipment that continually monitors, in real time, the delivery of all calls over the signaling network is disclosed in U.S. Pat. No. 5,592,530, entitled TELEPHONE SWITCH DUAL MONITORS, the disclosure of which is hereby incorporated by reference herein. The monitoring system disclosed in U.S. Pat. No. 5,592,530 is capable of tracking the number of calls that are abnormally dropped, or the number of calls that have abnormal completion. The monitoring system uses a distributed state machine that captures all of the SS7 messages within a mated pair cluster and correlates the fragmented SS7 messages pertaining to a particular call or transaction to a single data record. Furthermore, the system filters out redundant or unnecessary SS7 messages in order to compile call transaction records containing a minimum amount of essential data in order to evaluate overall system performance and to diagnose system errors when they occur.

The Telecommunications Act of 1996 mandated the implementation of Local Number Portability (LNP), which allows telephone customers to keep their current telephone numbers when they change telephone service providers. There are three types of LNP: service provider portability, location or geographic portability, and service portability. Service provider portability allows customers to keep their telephone numbers when they change local service providers. Geographic portability allows customers to keep their telephone number when they move outside the area covered by their current end office. Service portability allows customers to obtain telephone services from another switch without changing their telephone number. LNP in effect permits customers to "own" their telephone number and gives them the capability of changing service providers and services without worrying about having to change their telephone number. Also, LNP opens the way for new entrants in the telecommunication market to compete with the existing local service providers.

In order to implement LNP, a database is used to store routing information for customers who have moved from one local service provider to another. The LNP database typically is connected to the network as an SCP. The LNP SCP is accessed by the network STPs to determine the directory numbers of ported customers and the location routing numbers of the switch that serves the ported customers. LNP functionality is described in detail in BELLCORE specification GR-2936-CORE (Local Number Portability Capability Specification), the disclosure of which is hereby incorporated by reference herein.

The introduction of LNP creates problems for prior art monitoring systems. One problem created by LNP is the possibility that a query message for a single call may be detected at the same STP more than one time. This situation may occur if a query message travels through an STP in one direction from a Signaling Point (SP) to an LNP SCP and then travels through the same STP in the opposite direction from the LNP SCP to the SP. The STP will detect the query message for the transaction as it passes in each direction. Another problem can occur when multiple query messages are generated for a single call. In a two-leg call or transaction, a first query message may be generated by the end office, SP, or SSP, when a call is initiated, and a second query message, having a different identifier, may be generated by an LNP SCP. As a result, monitoring units may detect, at one or more STPs, multiple messages for a single call or transaction. This complicates the prior art monitoring system's capability to correlate the messages into a single call record.

The prior art network monitoring systems are not able to correlate multiple detections of a single query message that passes through the same network element more than once. Also, prior art systems are not equipped to correlate multiple messages, having different identifiers, that correspond to a single call or transaction. Instead, prior art systems merely monitor messages at a single network element. The problem of correlating messages captured by more than one monitoring unit is complicated by the introduction of LNP, or other services, in which multiple messages having different identifiers may be initiated for a single call or transaction as a result of LNP queries. On the other hand, as described above, the same message may pass through a single node multiple times, in a different direction each time, as the message passes between end offices and LNP databases.

SUMMARY OF THE INVENTION

The problems created by the introduction of LNP are solved in a system and method which time stamps all query messages that are detected at the network nodes and which uses the time stamped messages to determine which monitoring unit is the anchor, or controlling monitor, for that call.

It is a feature of the present invention to provide a surveillance system that helps network operators to manage their networks. Probes or monitors are used to capture message data that passes between network elements, such as STPs, SCPs or SPs. The probes determine which device is the anchor monitor for each call based upon which monitor detected the first message for a particular call.

It is another feature of the present invention for each monitor or probe to pass all data related to a particular call to anchor monitor for that call, wherein the anchor monitor is a controlling monitor for that call. The anchor monitor then correlates all of the data for a particular call into a complete call record for the call.

It is an additional feature of the invention to generate network performance statistics, thereby providing network managers with tools for use in managing the implementation and troubleshooting of LNP and other telecommunications services. The present invention calculates statistics such as the total number of calls, the number of calls that were ported, the number of non-ported calls, the number of calls with an error, and the types of call errors.

Another feature of the invention is to accurately trace all LNP based calls and transactions. The queries to support various calling features, such as 800, CLASS, or Line Information Database (LIDB) features, often require multiple levels of Global Title Translation (GTT) and traverse multiple signaling network elements before a response is returned. In some transactions, a STP may encounter a query multiple times and the direction may differ each time. Calls or transactions within a protocol boundary are collected by the present invention. If a call crosses protocol boundaries, it will appear as multiple calls and some legs of the call may have a different identifier. The monitoring unit claimed herein provides cross-protocol correlation of calls and transactions to provide a complete call record.

The foregoing has broadly outlined the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figures 1, 2:
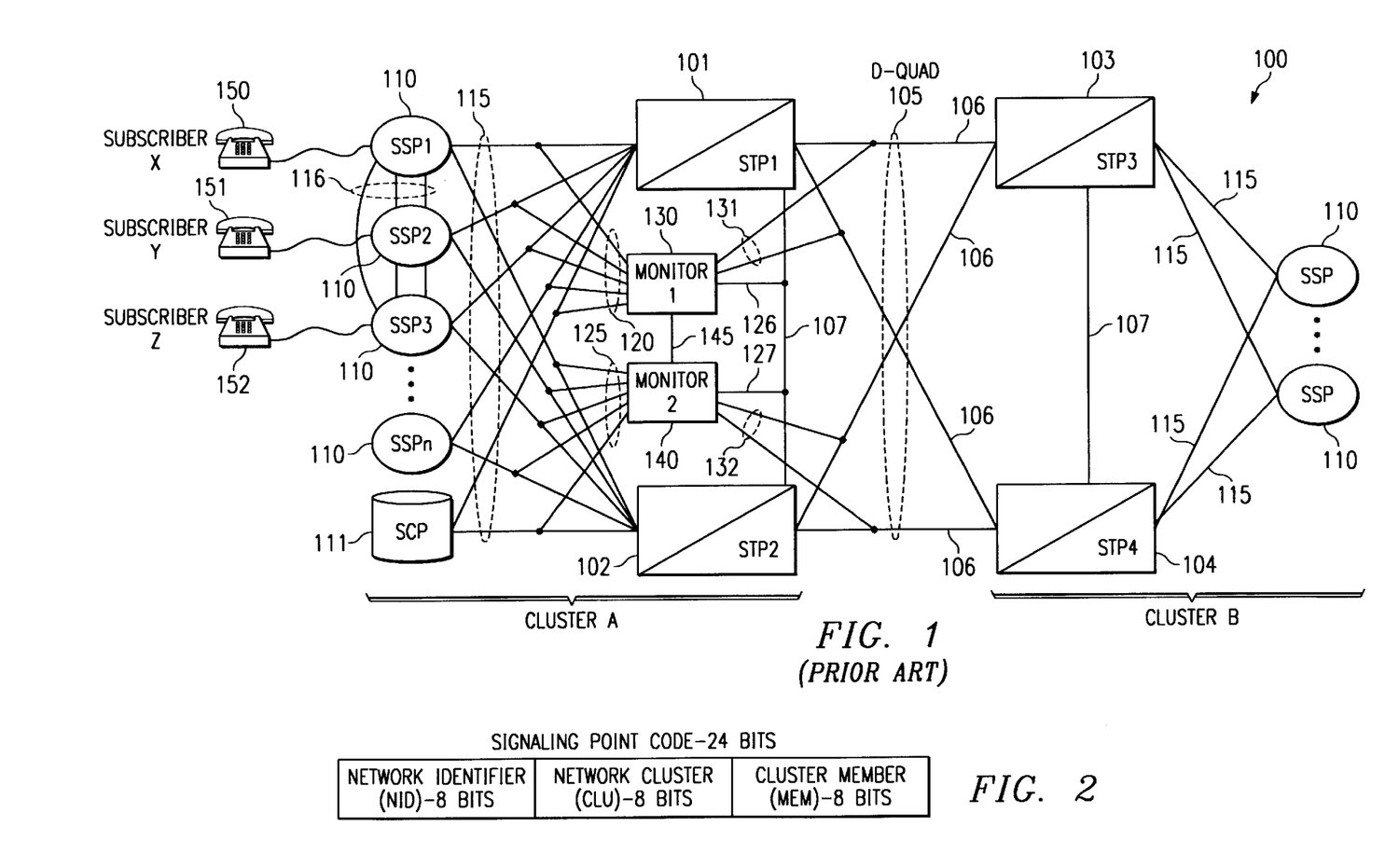
FIG. 1 shows two clusters within the telephone network, each containing a mated pair of STPs and their associated SSPs and SCPs.
FIG. 2 shows a 24 bit Signaling point Code data word divided into three sub-fields.

FIG. 1 depicts the basic SS7 network structure used in North America. The primary components are Signaling End Points (SEPs) and Signaling Transfer Points (STPs). The STPs are responsible for routing signaling messages from one SEP to another. For reliability, the architecture embodied in the American National Standard for SS7 recommends that SEPs be connected to the SS7 network via at least two STPs, known as a mated pair. The SEPs can be Switching Points (SPs), Service Switching Points (SSPs), Service Control Points (SCPs), or Operator Services Systems (OSSs). These SEPs are connected to the STPs via signaling links. For the purpose of simplicity, FIG. 1 depicts only the connection of SSPs and SCPs to a mated pair of STPs.

FIG. 1 contains a typical SS7 cluster (Cluster A) that includes a mated pair of STPs 101 and 102, associated SSPs 110, and an SCP 111. The mated pair of STPS are in geographically separated locations. If SSP1 wishes to send a message to SSP2, it can send the message through STP1 or through STP2 along the A-links 115 (access links). The function of an STP, then, is to route messages or transfer signals. Two STPs in a mated pair communicate by a C-link set 107 that carries network management data pertaining to system failures and routing information. In the event of failures, the C-link set is also used for routing application data. Also shown in FIG. 1 is Service Control Point 111. SCP 111 is the database computer for network 100 and is responsible for such functions as LNP, 800 number routing and tracking mobile phone subscribers.

Each network cluster can have up to 256 members. FIG. 2 shows a 24-bit Signaling Point Code. Each signaling point in a signaling network is uniquely identified by its Signaling Point Code. In the United States and Canada, this point code consists of three sequential eight-bit fields; a Network Identifier (NID), a Network Cluster (CLU), and a Cluster Member (MEM). For large networks, a unique Network Identifier is assigned. Such a network may consist of up to 256 network clusters, each of which may consist of up to 256 members.

STPs are always assigned a unique Network Cluster number, with a Cluster Member equal to zero. For example, in FIG. 1, STP1 may have the Signaling Point Code "255-254-000" and STP2 may have the Signaling Point Code "255-255-000." The remaining elements of Cluster A, the SSPs and the SCPs, all share the same Network Identifier (NID) and Network Cluster (CLU) with each other, and the CLU of the SSPs is different from the CLUs of STP1 and STP2. Only the Cluster Member field of each SSP differs from the other SSPs. For example, the Signaling Point Codes of the SSPs and SCPs may range between the values of "255-253-001" and "255-253-255."

The mated pair of STPs in Cluster A are linked to another mated pair of STPs 103 and 104 in Cluster B by a D-Quad link set 105. D-link sets connect different clusters in the same network. B-link sets are used to connect different networks. For simplicity in this discussion, we will assume a single network but it should be understood, of course, that the present invention may be used across multiple networks with the same operational characteristics.

Also shown in FIG. 1 are F-links 116 which connect individual SSPs, such as SSP1 and SSP3. The individual monitors of the present invention may also be used to monitor the performance of a single SSP, rather than two STPs in a mated pair, by deploying one monitor in such a fashion that it monitors all A-links and F-links connected to a single SSP. Such a configuration would be particularly important in European telephone systems, which often do not rely on STPs in mated pair configuration.

In a basic call scenario, Subscriber X owns telephone 150 which is connected to SSP1, which is an end office, and Subscriber Y owns telephone 151 which is connected to SSP2, which is also an end office. For the sake of simplicity, it is assumed that neither telephone 150 nor telephone 151 is an 800 number. If Subscriber X places a phone call to Subscriber Y. SSP1 must route that call to SSP2 before it can be sent to telephone 151. To accomplish this, SSP1 knows it must send the phone call through STP1 or STP2 in order to reach SSP2.

Every SS7 message contains a routing label consisting of a Destination Point Code (DPC), Origination Point Code (OPC), and the signaling link selection code. For example, in an SS7 message from SSP1 to SSP2, the OPC would be 255-253-001 and the DPC would be 255-253-002. As noted previously, all signaling points within a network have the same network identifier. Thus, all intra network message routing can be done by using only the network cluster and cluster member fields. Different SS7 standards were first drawn up by ANSI, Bellcore and the International Consultative Committee for Telephone and Telegraph (CCITT), which has since become the International Telecommunication Union (ITU). The CCITT has issued protocol recommendations for SS7 which include Integrated Services Digital Network End User part (ISDN-UP or ISUP), and Signaling Connection Control Part (SCCP). Within SS7, ISUP has been adopted as the interoffice signaling system for circuit switched basic call control. ISUP is also used for supporting call-related supplementary services, such as calling line identification presentation service and user-to-user signaling service.

Figure 3:
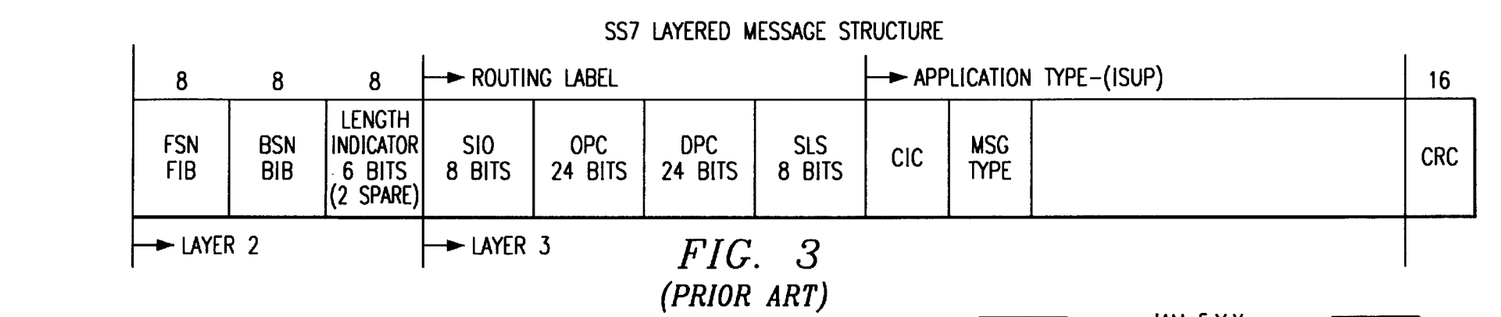
FIG. 3 shows a layered SS7 message structure for an Integrated Service User Part (ISUP) type application.

FIG. 3 depicts the layered protocol of SS7 message structure. Layer 1 (not shown in FIG. 3) is the physical layer which defines the electrical circuit characteristics of the SS7 network itself and is unimportant to the operation of the present invention. The first layer shown in FIG. 3 consists of 24 bits of Layer 2 information, known as the Link Data Layer, which are used to transmit data over a single link. Layer 2 information consists of an initial eight bits called Forward Sequence Number/Forward Indicator Bit (FSN/FIB), eight bits called Backward Sequence Number/Backward Indicator Bit (BSN/BIB), and finally eight bits which contain 2 spare bits and 6 Length Indicator bits.

Also shown in FIG. 3 is Layer 3 information which is of great importance to the present invention. Layer 3, which is sometimes called the Message Transport Part (MTP), contains the routing label that is essential to every SS7 message. The routing label consists of three main parts. The first eight bits are the Service Indicator Octet (SIO). The SIO consists of the User Part (four bits) which indicates the Application Type, Network Indicator (two bits) and Message Priority (two bits). Immediately following the SIO are the OPC and the DPC. The next portion of the label is the Signaling Link Selection code (SLS). The SLS effectively determines which routes the messages traverse. For any given call or transaction, an SSP will allocate the same SLS for all messages that it sends during that call. In the absence of failures, all messages for that call that are sent by the SSP will traverse the same route through the SS7 network down to the link level. However, messages coming in the reverse direction from SSP2 to SSP1 may be traveling on a different route. Those messages are originating in SSP2 will have a different SLS code than messages originating in SSP1. Each SSP will use a constant SLS throughout an entire caller transaction so that messages never arrive at the destination out of order. If SSP1 were to send out messages on a first A-link and then another message on a second A-link, they might arrive at SSP2 in reverse order. However, if SSP1 always utilizes the same link, the messages sent from SSP1 to SSP2 must always arrive in the same order in which they were generated.

The User Part of the routing label is also known as the service indicator field. User Part is important in the operation of the present invention since it defines the application type. For the purposes of this disclosure, the application type that will be discussed will be the ISUP, or ISDN User Part. It should be understood that the systems and methods disclosed in the present application apply equally well to application types other than ISUP, and any derivation of ISUP, such as SCCP. Furthermore, the present invention applies to Transaction Control Application Part (TCAP). ISUP is related to the voice circuit connections between users and those types of communications are referred to herein generally as "calls." On the other hand, TCAP applies to transactions, such as LNP queries, which are generally referred to herein as "transactions." It will be understood that the monitoring functions described apply to both transactions and calls interchangeably.

The User Part in the routing label will define what the remaining portion of the SS7 message following the SLS will look like. At the end of the SS7 message there will be a cyclic redundancy check, known as CRC, which consists of two bytes (16 bits). This field is a character check field which is used to verify the received bits of the SS7 message. In an ISUP message, the first field following the SLS is the Circuit Identification Code (or CIC), which identifies to which voice and data circuit on the trunk, and to which voice and data circuit between two different switches, the message pertains. The next field after the CIC is the Message Type (or MSG TYPE). The technical name for Message Type is H1H0 Code.

Figure 4:
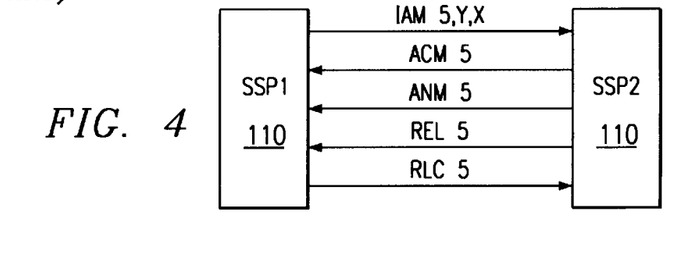
FIG. 4 shows selected SS7 messages in a typical ISUP call transaction between two SSPs.

FIG. 4 shows a typical ISUP call scenario between SSP1 and SSP2 with various message types shown, such as Initial Address Message (IAM), Address Complete Message (ACM), Answer Message (ANM), Release Message (REL), and Release Complete Message (RLC). The data field following MSG TYPE will be entirely determined by the bit values in the MSG TYPE field. The typical ISUP call scenario is initiated when telephone 150 attempts to call telephone 151. In these SS7 messages, SSP1 is the Origination Point Code (OPC) and SSP2 is the Destination Point Code (DPC). The ISUP call scenario depicted in FIG. 4 begins with an Initial Address Message (IAM). All of the messages in FIG. 4 are routed through STP1 or STP2, which use the OPC and DPC to determine that SSP1 is attempting to communicate with SSP2. In FIG. 4, arrowheads on each line connecting SSP1 and SSP2 indicate the direction that the message is flowing, i.e., from SSP1 to SSP2 or from SSP2 or SSP1.

In addition to ISUP, there are many other applications defined by User part in the SIO field. These applications include SCCP. SS7 provides TCAP, which is a tool kit for an application at one SS7 node to invoke execution of a procedure at another node and exchange the results of such an invocation. SS7 also has the SCCP, which provides extensive routing capability. In SS7, an application can directly address another application if it has the node address of that application. Otherwise, it can use the GTT capability of SCCP. All SS7 signaling messages, such as ISDN-UP for telephony and TCAP for database access, are used between network nodes.

Figure 5:
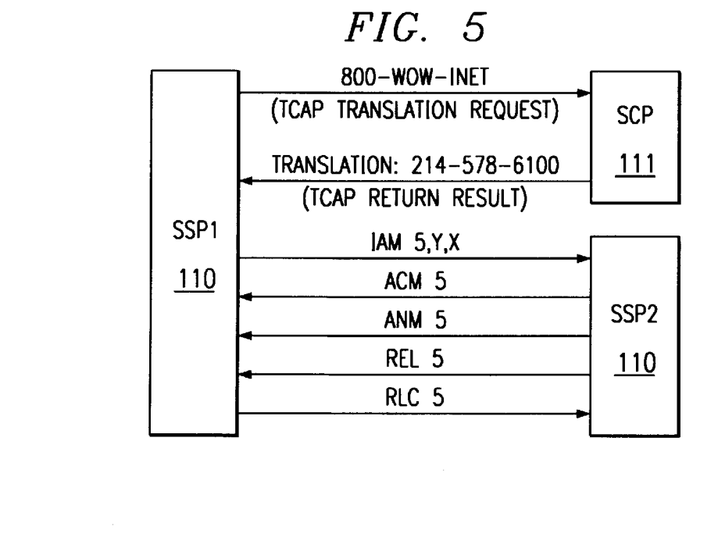
FIG. 5 shows selected SS7 messages in a typical Transaction Control Application Part (TCAP) transaction application, wherein an 800 number telephone call has been placed from one SSP to another SSP.

FIG. 5 depicts a TCAP transaction whereby Subscriber X places a toll-free call using an 800 number to Subscriber Y. The TCAP transaction begins with a query which is sent to the SCP for the mated pair cluster to obtain a translation for the 800 telephone number. The DPC contains the signaling point code for the SCP. The SCP will search its database for the telephone number which corresponds to the 800 request and will relay the translated phone number back to the OPC, which is SSP1. When SSP1 has received the translated phone number it will initiate a phone call to Subscriber Y (telephone 151) through SSP2 in a manner similar to the ISUP transaction depicted in FIG. 4.

Monitor 130 and monitor 140 are connected by communications bus 145. Monitor 1 monitors all of the links to STP1 by means of link taps 120, 126 and 131 and tracks the calls through STP1. Monitor 2 performs the same functions for STP2 using link taps 125, 127 and 132. At any given time, there could be many calls going simultaneously between SSP1 and SSP2. Since there can be up to 255 SSPs in the cluster, there may be thousands of messages entering and leaving STP1 and STP2 each second.

Figure 7:
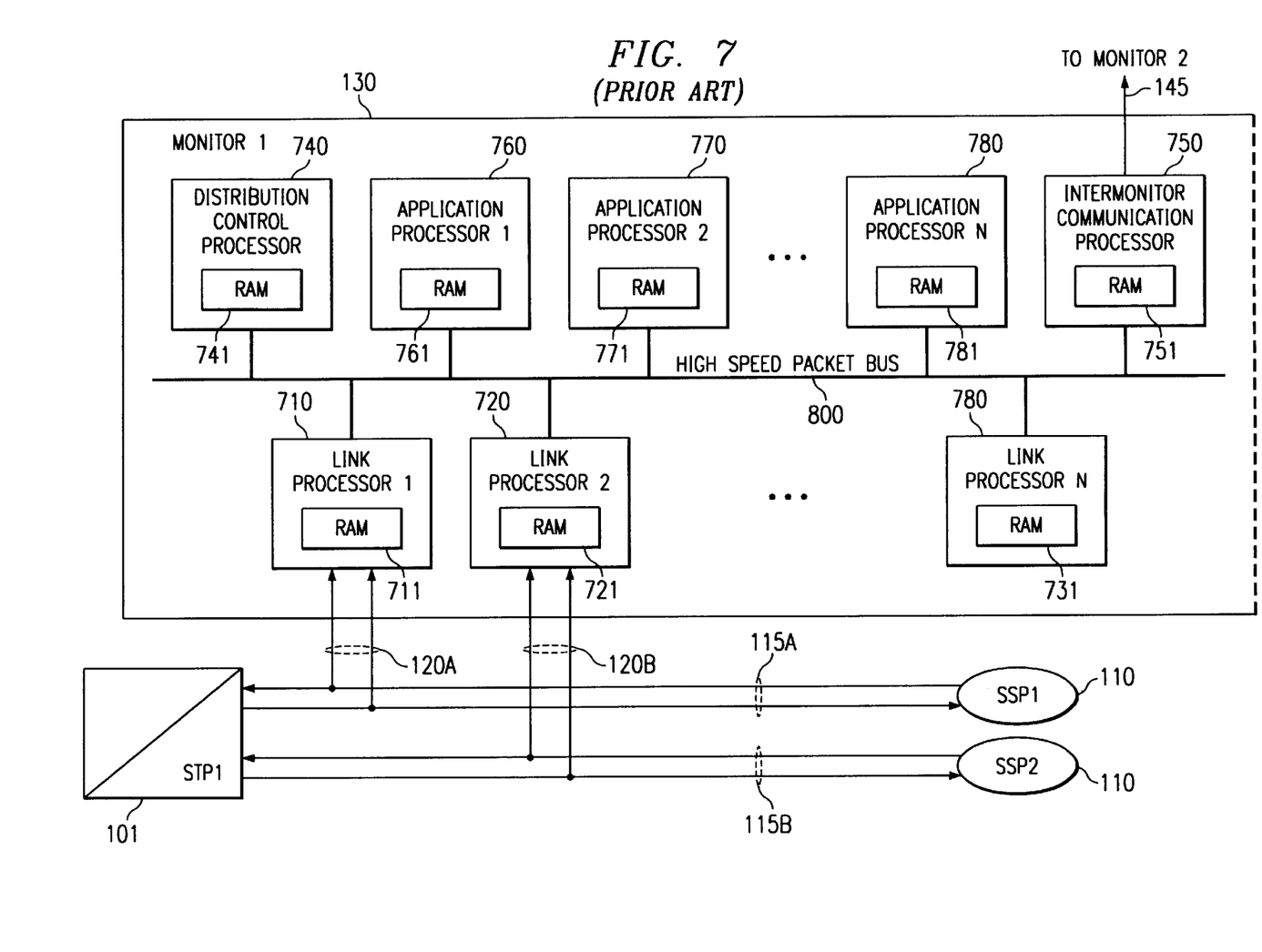
FIG. 7 shows a general block diagram of the architecture of the monitor used in the present invention.

FIG. 7 shows the internal architecture and the physical connections to A-links 115A and 115B for Monitors 130 and 140 (FIG. 1). Link tap 120A and link tap 120B route the captured SS7 messages from the bidirectional A-links to link processor 710 and link processor 720 contained in Monitor 130. Monitors 130 and 140 contain a plurality of link processors that capture SS7 messages from the A-links surrounding STP1. Link processors 710, 720 and 730 have associated Random Access Memories (RAM) 711, 721 and 731 and are connected to a high speed packet bus 800 in Monitor 1. Application processors 760, 770 and 780 are also connected to high speed packet bus 800 and have associated RAM 761, 771 and 781. Selected SS7 messages are sent from Monitor 1 to Monitor 2 on bus 145 by means of inter-monitor communication processor 750, which is connected to high speed packet 800 and has an associated RAM memory 751. Finally, distribution control processor 740, which has an associated RAM memory 741, is also connected to bus 800. Distribution control processor 740 has two main functions. First, it correlates messages for each particular call, and second, distribution control processor 740 balances the load across application processors 760, 770, and 780. Bus 800 is used as the internal communication path between the processors of the monitors of the present invention. The disclosure of U.S. Pat. No. 5,592,530, which is incorporated herein, describes the operation of the components of monitors 130 and 140 in detail.

Turning again to FIG. 1, it is important to note that each monitor will see each SS7 message twice. For example, an IAM message sent from SSP1 to SSP2 through STP1 will first be seen on the A-link connecting SSP1 to STP1, and then again on the A-link connecting STP1 to SSP2. Monitor 1 and Monitor 2 take this into account for each SS7 message in order to avoid erroneously assigning each message to different call records. SS7 systems are robust and utilize STPs in mated pairs for redundancy purposes. If SS7 messages from SSP1 to SSP2 that traverse through STP1 are interrupted by a failure of the links to STP1, those SS7 messages will automatically be re-routed through STP and the call will continue with all SS7 messages between SSP1 and SSP2 in both directions being routed through STP2. The present invention can continue to maintain the call records in such a case because OPC, DPC and CIC data fields will maintain their correlation with the phone calls.

Figure 6:
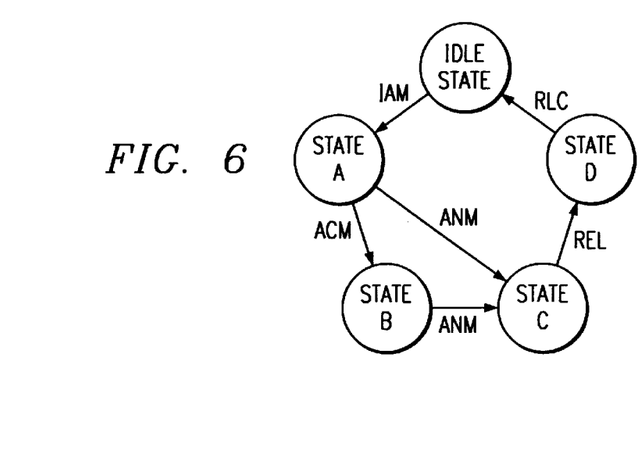
FIG. 6 shows a complete machine cycle of a typical state machine of the present invention as it cycles from state to state in response to the capturing of selected SS7 messages.

To trace a single call, one could typically implement a state machine such as the one shown in FIG. 6. An IAM message triggers one instance of the state machine. Subsequent SS7 messages cause the state machine to transition through different states until an RLC returns the machine to an idle state. While one IAM will instantiate only one instance of the state machine, at any given time there are thousands of instances of the state machine being executed. In most other processor applications, a state machine is typically implemented in one processor, in one location. In the present invention, however, the SS7 messages may be sent through different STPs, causing the SS7 messages to be captured by different monitors. One instance of the state machine may therefore be distributed between one processor in Monitor 1 and one processor in Monitor 2.

In some situations, both Monitor 1 and Monitor 2 may detect IAM messages, and both machines will instantiate state machines for the call and assume the role of primary state machine. In most cases the monitors will resolve this problem as described in U.S. Pat. No. 5,592,530.

Figure 8:
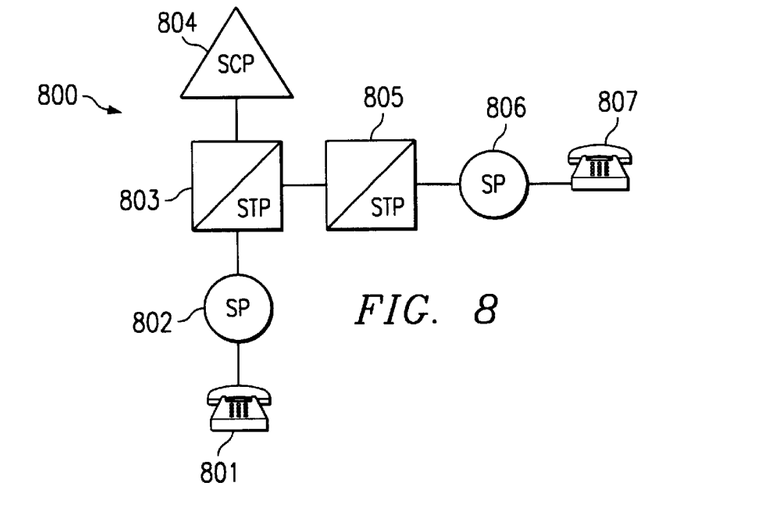
FIG. 8 is a simplified block diagram of a signaling network.

FIG. 8 shows a simplified block diagram of signaling network 800. It will be understood that network 800 may comprise numerous other components, such as additional STPs, SSPs, SCPs or SPs, as needed to implement various telecommunications services. Furthermore, STPs 803 and 805 may be connected to other STPs (not shown) in a mated pair configuration. Caller 801 is connected to signaling point (SP) 802, which alternatively may be an SSP, an end office or a local service provider switch. Typically, caller 801 is linked to SP 802 via a copper wire twisted pair. SP 802 routes calls from caller 801 to calling destinations, such as called party 807. By using the NPA-NXX digit string of the dialed number, SP 802 may detect when caller 801 has dialed a destination telephone number that has been ported to a new service provider. The dialed number NPA-NXX can be used to trigger a LNP database query to retrieve the Location Routing Number (LRN) of the dialed number.

In network 800, SCP 804 is a LNP database. When SP 802 detects that caller 801 may have dialed a ported number, SP 802 sends a query to SCP 804 requesting the directory number of the ported called party and the LRN of the switch that serves the called party. SP 802 identifies potentially ported numbers by the dialed NPA-NXX. As operators port numbers from their switches, then the corresponding NPA-NXX for those switches are identified as having ported numbers. Thereafter, any time a call is made to a number having that NPA-NXX, then there must be an LNP query to determine if the specific dialed number has been ported to another switch. As a result, even if only one subscriber having a certain NPA-NXX has been ported, then all calls to that NPA-NXX will generate an LNP query.

SCP 804 is accessed through STP 803. The query is translated by GTT to go to the appropriate SCP 804. The LNP database, SCP 804, may be accessed using either Advanced Intelligent Network (AIN) or Transaction Control Application Part Intelligent Network (TCAP IN) protocols. Once SP 802 receives the LNP response, it 802 formulates an IAM message using the LRN received from SCP 804. The call is then routed via STPs 803 and 805 to SP 806. Switch 806 then connects the calling party to called party 807 at the ported number.

It will be understood that monitors, such as 130 and 140 of FIG. 1, may be used in system 800 to track both the call circuit messages associated with caller 801's call to called party 807 and the related LNP transaction messages. For calls in the circuit portion of the network, each message will have a CIC with a unique identifier, which allows the monitors to correlate which messages belong to a particular call. For transactions, corresponding messages will have the same Transaction Identifier (TID), which allows the monitors to correlate which messages belong to a particular transaction.

Figure 9A:
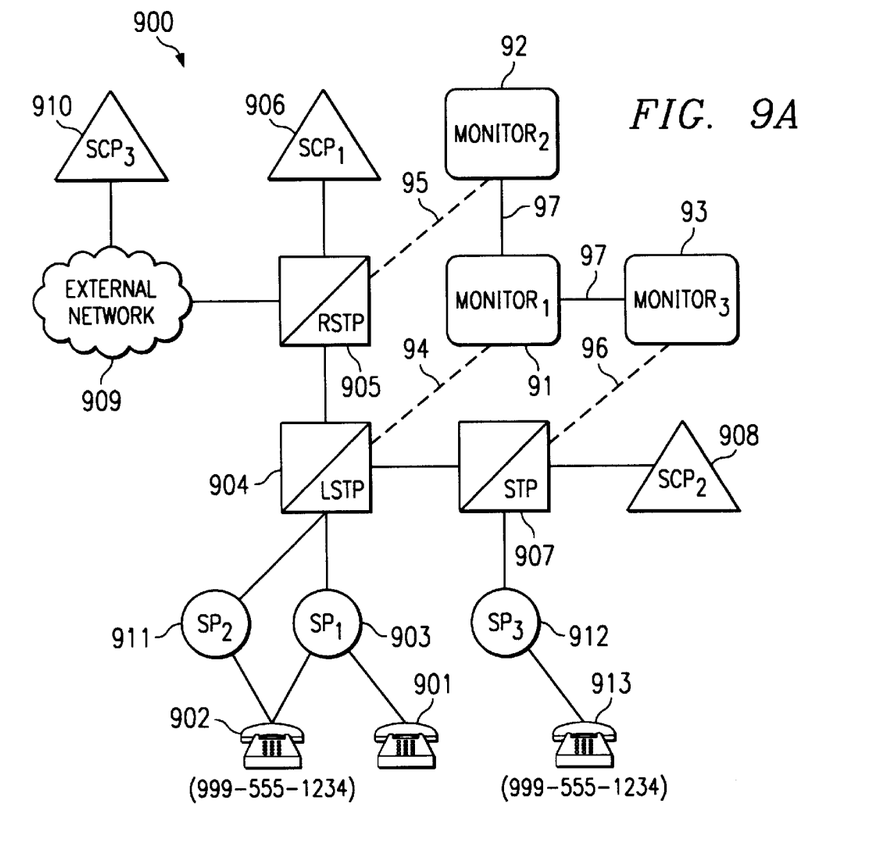
FIG. 9A is a simplified block diagram of a signaling network including the monitors used in the present invention.

FIG. 9A is a block diagram of network 900. In system 900, caller 901 desires to call called party 902, who has a ported number. Called party 902 may have changed telephone services or local service providers, in which case party 902's telephone number may have been ported within the original end office, SP1 903, or to a different end office, such as SP2 911. Alternatively, the called party may have moved to a new geographic location, such as 913, and kept his or her original telephone number, which would require the ported number to be served by end office SP3 912.

System 900 illustrates the use of signaling monitors 91, 92, and 93, which monitor the messages that are transmitted and received by STPs 904, 905, and 907. Links 94, 95, and 96 are a simplified representation of the monitoring links shown in FIG. 1 as lines 120, 125–127, 131, and 132. Links 94–96 allow each monitor 91–93 to detect all of the messages that are processed by the respective STP 904, 905, and 907. Since each monitor sees the messages for only one STP, a particular monitor 91–93 may not see all, or even any, of the messages for a particular call if those messages do not pass through the monitored STP in network 900. Monitors 91–93 are linked by inter-monitor bus 97, which is used to exchange information about the SS7 messages. Monitors 91–93 use an inter-monitor communications protocol (IMCP) to exchange information.

System 900 also includes LNP SCPs 906, 908 and 910. SCP1 906 and SCP2 908 are both part of the service providers network. However, SCP3 910 is part of an external network 909. Queries to external network 909, and SCP3, are performed by Regional STP (RSTP) 905.

Referring to both FIGS. 9A and 9B, the various signaling messages will be discussed for a call from caller 901 to called party 902. In this example, when caller 901 dials called party 902's telephone number, the originating end office, SP1 903, recognizes that the dialed NPA-NXX (such as 999-555) may be a ported, which triggers an LNP query. When SP1 initiates a query to LNP database SCP1, the message has a unique TID, for example "TID x".

Typically, the query message is a Signal Unit (SU) sent between network elements. Since each message for each call will have a unique TID (or CIC), monitors 91–93 can track and identify messages related to specific transactions (or calls).

The initial LNP query is sent from SP1 to SCP1 via Local STP (LSTP) 904 and Regional STP (RSTP) 905. As shown in lines 952–954, monitors 91 (M1) and 92 (M2) each capture a portion of the query message as it traverses LSTP 904 and RSTP 905. Each message detected by monitors 91 and 92 is time stamped. The first monitor 91–93 that detects a message is designated as the "anchor" for that call. All of the other monitors 91–93 will then send any data for the call to the anchor monitor via bus 97. The anchor monitor then correlates all of the data for a particular call and generates statistics for the call and for the network using call data. It is important for the anchor monitor to get all of the call information from the other monitors so that the anchor will have a complete record of the call data.

Since more than one monitor 91–93 will see a message for a particular call, as shown in lines 952–954, the monitors must negotiate for control of the call record and for designation as the anchor. This is accomplished by having each monitor 91–93 broadcast the first detected message to the other monitors on bus 97. Since the messages have been time stamped, the monitors can determine which monitor captured the first or earliest message. The monitor having the earliest message will be designated the anchor. For example, in lines 952–954, M1 will capture and time stamp the first message for TID x. Then, M1 will broadcast the time-stamped message to the other monitors in the system, M2 and M3, to signify that it is the anchor for messages having TID x. Later (within seconds), M2 will capture and time stamp the message having TID x and will broadcast its time-stamped TID x message on bus 97. The monitors, M1 and M2, will compare the time-stamped messages and they will determine that M1 is the anchor for any messages having TID x since M1's message has the earliest time stamp. M2 will then send all stored data for TID x to M1 and M1 will then correlate the data for the call.

One problem with the introduction of LNP is that more than one message may be associated with one call. For example, if SCP1 906 does not have the LNP data for called party 902, then it 906 may initiate a second query to other LNP databases in other SCPs, such as SCPs 908 and 910. Lines 955–964 represent a query message from SCP 906. Although this second query is part of the caller 901's call to 902, it has a new TID of y because it is initiated by SCP1. First, query y traverses RSTP 905, LSTP 904 and STP 907 to arrive at SCP2 908. As indicated in lines 955–958, all three monitors 91–93 capture part of the data for this message. However, since this message has a new TID, a new anchor must be designated for these messages. When monitors 91–93 track the call and exchange time stamped messages for TID y, M2 will be designated the anchor for TID y because it will have the first message. Thereafter, M1 and M3 will send all TID y data to M2 for tracking.

In the event that SCP2 908 does not have the LNP data for the dialed NPA-NXX, then the query is routed to SCP3 as shown in lines 959–962. In the example shown, these messages still has a TID of y and they are tracked in part by each monitor 91–93. Lines 963–964 indicate the return message from SCP3 to SCP2, which finally provides SCP2 with the requested LNP data. This allows SCP2 to return the LNP data to SP1 in reply to the original query having TID x. Lines 965–967 represent the return of LNP information to SP1. In line 968, SP1 is able to correlate the dialed NPA-NXX to the actual connection for called party 902. When this query has been returned to SP1, the anchor, M1, can correlate all of the data for the messages and generate call statistics.

Figure 9B:
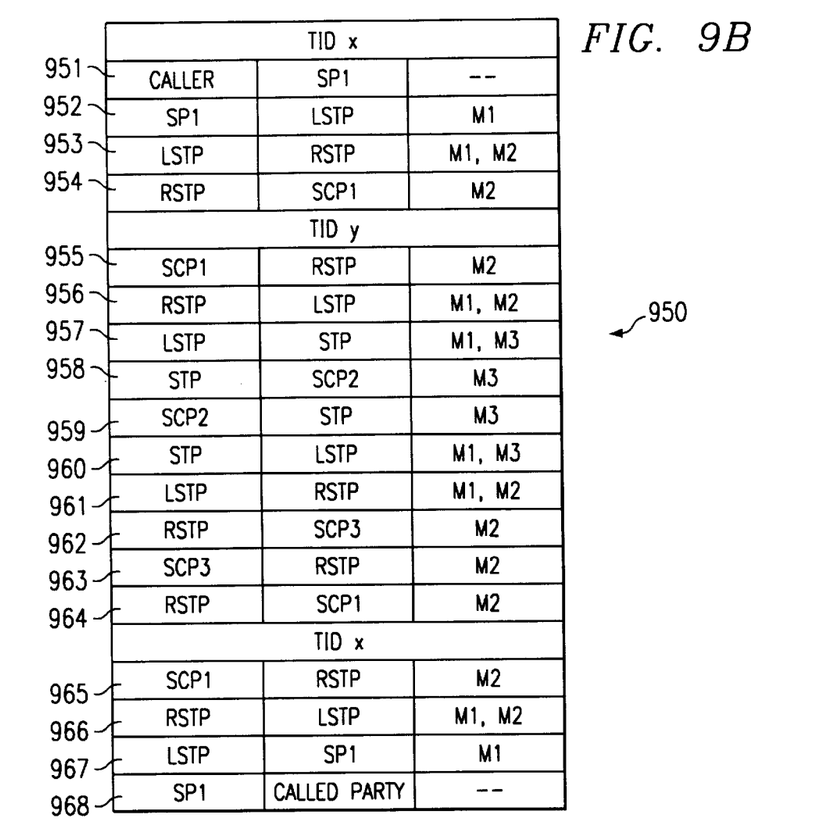
FIGS. 9B–9D illustrate messages in the network of FIG. 9A.

Lines 955 to 962 of FIG. 9B illustrate how a network node may detect the same message multiple times. As the message (TID y) passes through RSTP 905, LSTP 904, and STP 907, and then back again in lines 955–962, each STP will detect the query twice. These queries must be correlated as belonging to the same call or transaction. Also, all the message data must be sent to one anchor monitor. On the other hand, lines 951–968 as a whole illustrate a two-leg call in which a single call or transaction can generate messages having more than one identifier.

For situations in which one call or transaction generates multiple messages with different identifiers, monitors 91–93 correlate the variously identified messages using both the called party number (NPA-NXX-XXXX) and the message time stamp. In the example above, although the messages have different TIDs (x and y), the corresponding messages will have the same called party number. Using this parameter, monitors 91–93 can identify potentially related messages. In order to prevent the incorrect correlation of messages that have the same called party number, but that were initiated by different callers, monitors 91–93 only correlate messages that fall within a predetermined, configurable time period, such as a few seconds. For example, if caller A and caller B both dial the same ported called party number, LNP query messages having different TIDs will be generated. However, it is unlikely that the messages will pass through the same STP within the very short time period required.

As discussed above, monitors using the present invention broadcast their earliest time-stamped message for each TID, or CIC, detected and wait for other monitors to broadcast messages having earlier or later time stamps. While waiting to determine which monitor is the anchor, each monitor stores all subsequently detected messages of each particular TID in a queue. Once the anchor is determined, the non-anchor monitors empty their queues by broadcasting the stored messages to the anchor. In the situation in which only one monitor 91–93 detects a particular TID or CIC, then no other monitor 91–93 will broadcast a message having an earlier or later time stamp. To deal with this situation, the monitors wait only a specific configurable length of time before defaulting to an anchor status. This time out arrangement enhances efficiency by preventing monitors from waiting for other monitors to broadcast a message that may never be detected.

Figure 9C:
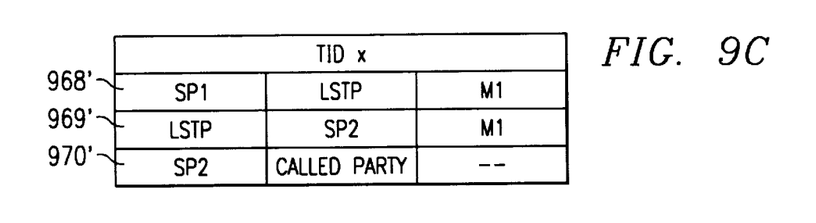
Figure 9D:
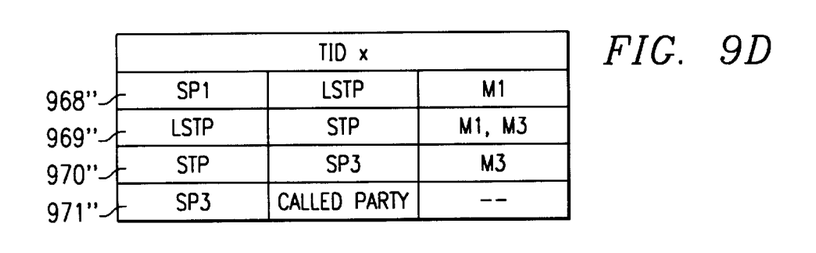

In the example illustrated in FIG. 9B, the called party is still serviced by the same end office. FIG. 9C illustrates the case in which called party 902 has changed end offices when their number was ported to SP2 911. In lines 968'–970' additional messages are sent through network 900 in order to route the call to called party 902 through SP2 911. Similarly, in FIG. 9D, lines 969"–971" represent additional messages to route caller 901's call to the called party who has moved to location 913 and has a ported telephone number served by SP3 912. For the calls illustrated in FIGS. 9B–D, monitors 91–93 correlate the call message data by assigning an anchor monitor which has the responsibility to gather all of the message data. The other, non-anchor monitors send all of the call data that they collect to the anchor.

It will be understood that, although the originating SP generates the LNP query in the example described above, in other situations the destination SP or called party's end office can generate the LNP query. In either case, monitors 91–93 track and correlate the message data for each call. This allows monitors 91–93 to calculate statistical information related to network 900's performance. The network statistics are calculated by using all of the data that has been generated for each call.

A significant advantage of the present invention is the capability to correlate all of the message traffic that is associated with a particular call, especially in a complicated signaling environment such as LNP. By obtaining a complete record of the messages for individual calls, the present invention can detect whether a particular call was made to a ported or non-ported number. Also, the system determines whether an LNP query was made and whether the query was successful or failed. Additionally, the monitors can detect the number of TCAP messages, the number of AIN messages, and the number of ISUP calls. The system is further capable of detecting misrouted and invalid address calls. Prior art monitoring units do not provide the capability of correlating all possible related messages. Instead, the prior art units simply recorded message data at a single STP.

Table 1 illustrates the performance statistics that are maintained by the present invention to support LNP under TCAP.

TABLE 1

Performance Statistics Maintained to Support LNP Under TCAP

Number of TCAP messages per point code per op-code per Subsystem Number (SSN) per Transaction Type Number (TTN)
Number of TCAP messages per point code per op-code per SSN per error code
Number of AIN messages per point code (op-code as listed below)

Automatic Code Gap (ACG)
Analyze Route
Authorize Termination

TABLE 1-continued

Performance Statistics Maintained to Support LNP Under TCAP

Disconnect
Info Analyzed
Request Report Basic Call Model (BCM) Event
Send Notification
Termination Attempt Table 2 illustrates the performance statistics that are calculated by the present invention to support LNP.

TABLE 2

Performance Statistics Maintained to Support LNP

Number of LNP queries per point code
Numbner of LNP queries if the Forward Call Indicator (FCI) bit is set on the ISUP IAM message and GAP parameter indicates Number Translated"
Number of LNP query failures per point code
Number of ISUP calls that are ported per point code
Number of ISUP calls that are non-ported per point code
Number of ISUP REL messages per point code for misrouted calls to a ported number
Number of ISUP REL messages per point code for invalid address format/address incomplete
Number of calls resulting in Unallocated Number in the donor switch
Number of calls wherein GAP parameter indicates number translated with Generic Address Parameter (GAP) digits missing
Ratio of LNP queries failed to LNP queries per point code
Ratio of ported ISUP calls to total ISUP calls
Ratio of non-ported ISUP calls to total ISUP calls
Ratio of REL messages with "Misrouted call to a ported number" cause to ported ISUP calls
Ratio of REL messages with "Invalid address format" cause to ported ISUP calls
Number of calls resulting in unallocated indication
Number of calls wherein a switches' own LRN is detected following an LNP query The present invention includes a function to differentiate among SS7 messages for different services (800, LIDB, CLASS) based on translation type. Additionally, the present invention supports filtering/viewing/searching based on translation type. LNP transactions have an AIN SSN(248) with a particular set of translation types. In the preferred embodiment of the monitoring unit, SSN/TTN combinations can be mapped to applications.

Although the present invention and its advantages have been described in detail, it should be understood that various changes, substitutions and alterations can be made herein without departing from the spirit and scope of the invention as defined by the appended claims.

What is claimed is:

1. A monitoring system for use in a communications network in which call control information pertaining to a communication link carrying voice or data signals between system users pass through one or more network components, wherein said network components are geographically separated from each other, said monitoring system comprising:

processors associated with particular ones of said network components, said processors operable for receiving and temporarily storing therein selected call control information as said call control information passes through said associated network components, said stored call control information identifiable for a particular transaction, wherein said each of said processors comprise:

means for storing all selected call control information for a particular transaction in a unified list sorted by time of occurrence of said call control information;

means for communicating with other said processors, said communicating means permitting said processors to exchange data related to said particular transaction, wherein said processors comprise means for detecting said data having a same identifying code;

means for allowing said processors to identify one of said processors as a controlling processor for said particular transaction; and means for combining said unified lists for all stored selected call control information for said particular transaction in said controlling processor.

2. The system of claim 1 further comprising:

means for generating transaction statistics using said unified lists of said selected call control information, wherein said statistics correspond to at least one of the following transactions in said network from a group consisting of:

Local Number Portability (LNP) transactions; and

CLASS related transactions.

3. The system of claim 2 wherein said statistics correspond to CLASS related transactions in said network.

4. The system of claim 1 wherein said processors further comprise:

means for combining lists of call control information, wherein said lists correspond to a single transaction in which associated messages have more than one identifier.

5. The system of claim 1 wherein said network components selected from the group consisting of:

Signaling Transfer Points (STPs);

Signaling End Points (SEPs);

Service Switching Point (SSP);

Signaling Point (SP); and

Signaling Control Point (SCP).

6. The system of claim 1 wherein said selected call control information is a subset of the calling protocol used in routing and controlling telephone calls.

7. The system of claim 6 wherein said subset includes a calling party identification, a called party identification and a communication network link identification for said communication link over which said communication is established and at least one field of data pertaining to operational aspects of the call.

8. The system of claim 4 further comprising:

a memory for storing a plurality of said unified lists; and a communications bus for transferring said selected call control information among said processors.

9. The system of claim 8 further comprising a second communications bus for transferring said unified lists to a computer database for use in telephone system applications.

10. A system for monitoring statistics in a communications network having a plurality of Signaling Transfer Points (STPs), said network providing local number portability (LNP) capability to network users, said system comprising:

a plurality of monitoring units, each of said monitoring units coupled to one of said STPs and functioning to capture LNP data messages passing through said one of said STPs, wherein said data messages are associated with particular transactions on said network, said monitoring units comprising:

means for time stamping each of said data messages;

means for identifying said data messages corresponding to particular transactions; and means for combining corresponding ones of said data messages in a call record for each of said particular transactions, wherein at least one of said data messages is selected from a group consisting of:
data messages having a same identifying code; and
data messages having more than one identifier; and
means for identifying one of said monitoring units as a controlling monitor for a particular transaction.

11. The system of claim 10 further comprising:
means for generating statistical information from a plurality of said call records, wherein statistical information is related to performance parameters of said communications network, and wherein said statistical information comprises the number of Transaction Control Application Part (TCAP) messages per point code per op-code per Subsystem Number (SSN) per Transaction Type Number (TTN).

12. The system of claim 10 wherein said statistical information comprises:
the number of TCAP messages per point code per op-code per SSN per error code.

13. The system of claim 10 wherein said statistical information comprises:
the number of Advanced Intelligent Network (AIN) messages per point code.

14. The system of claim 13 wherein said statistical information of the number of AIN messages per point code are further specified per op-code, wherein said op-code is selected from the group consisting of:
Automatic Code Gap (ACG);
Analyze Route;
Authorize Termination;
Disconnect;
Info Analyzed;
Request Report Basic Call Model (BCM) Event;
Send Notification; and
Termination Attempt.

15. The system of claim 10 wherein said statistical information comprises data selected from the group consisting of:
a number of LNP queries per point code;
a number of LNP queries if the Forward Call Indicator (FCI) bit is set on the Integrated Service User Part (ISUP) Initial Address Message (IAM) message and Generic Address Parameter (GAP) parameter indicates "Number Translated;"
a number of LNP query failures per point code;
a ratio of LNP queries failed to LNP queries per point code; and
a number of calls wherein a switches' own Location Routing Number (LRN) is detected following an LNP query.

16. The system of claim 10 wherein said statistical information comprises data selected from the group consisting of:
a number of ISUP calls that are ported per point code;
a number of ISUP calls that are non-ported per point code;
a number of ISUP Release Message (REL) messages per point code for misrouted calls to a ported number;
a number of ISUP REL messages per point code for address incomplete; and
a number of ISUP REL messages per point code for invalid address format.

17. The system of claim 10 wherein said statistical information comprises data selected from the group consisting of:
a ratio of ported ISUP calls to total ISUP calls;
a ratio of non-ported ISUP calls to total ISUP calls;
a ratio of REL messages with a "Misrouted Call to a Ported Number" cause to ported ISUP calls; and
a ratio of REL messages with a "Invalid Address Format" cause to ported ISUP calls.

18. The system of claim 10 wherein said statistical information comprises data selected from the group consisting of:
a number of calls resulting in unallocated indication;
a number of calls resulting in "Unallocated Number" in the donor switch; and
a number of calls wherein GAP parameter indicates number translated with GAP digits missing.

19. A system for monitoring the performance characteristics of a telecommunications signaling network comprising:
means for detecting signaling messages that are routed through at least one switching component;
means for distinguishing among said detected signaling messages in order to associate each of said signaling messages with a particular call, wherein at least one of said signaling messages is selected from a group consisting of:
signaling messages having a same identifying code; and
signaling messages having more than one identifier;
means for compiling a call record for said particular call, wherein said call record comprises detected signaling messages associated with said particular call;
means for determining which of a plurality of monitoring units is an anchor monitor for said particular call, wherein each of said plurality of monitoring units maintain a partial call record for said particular call;
means for transferring said partial call records to said anchor monitor in order to compile a substantially complete call record for said particular call; and
means for compiling call statistics from a plurality of said substantially complete call records.

20. The system of claim 19 further comprising:
means for associating each of said detected signaling messages with a time code.

21. The system of claim 20 wherein said determining means further comprises:
means for identifying which of said monitoring units detected a first signaling message for said particular call.

22. The system of claim 19 further comprising:
means for displaying said call statistics to a user.

23. The system of claim 19 wherein said call statistics comprise:
a number of LNP queries for a certain type of call.

24. The system of claim 19 wherein said call statistics comprise:
a number of ported calls for a certain type of call.

25. The system of claim 19 wherein said call statistics comprise:
a number of non-ported calls for a certain type of call.

26. The system of claim 19 wherein said call statistics comprise:
a number of misrouted calls for a certain type of call.

27. The system of claim 19 wherein said call statistics comprise:

a ratio of ported calls to total calls.

28. The system of claim 19 wherein said call statistics comprise:

a ratio of non-ported calls to total calls.

29. A computer program product having a computer readable medium with computer program logic recorded thereon for use in a system for monitoring a telecommunications signaling network, said network having one or more switching components, the computer program product comprising:

means for storing selected information for a particular transaction in a unified list sorted by time of detection of said information;

means for communicating with processors, said communicating means permitting said processors to exchange data related to said particular transaction;

means for allowing said processors to identify one of said processors as an anchor processor for said particular transaction;

means for combining a plurality of unified lists for said particular transaction in said anchor processor, wherein said lists correspond to at least one of the following transactions from the group consisting of:

a single transaction in which associated messages have more than one identifier; and a single transaction in which said processors detect a plurality of messages each having a same identifying code; and means for generating transaction statistics using said unified lists of said selected call control information.

30. The system of claim 29 wherein said transaction statistics comprise:

the number of TCAP messages per point code per op-code per SSN per TTN.

31. The system of claim 29 wherein said transaction statistics comprise:

the number of TCAP messages per point code per op-code per SSN per error code.

32. The system of claim 29 wherein said transaction statistics comprise:

the number of AIN messages per point code.

33. The system of claim 32 wherein said transaction statistics of the number of AIN messages per point code are further specified per op-code, wherein said op-code is selected from the group consisting of:

ACG;

Analyze Route;

Authorize Termination;

Disconnect;

Info Analyzed;

Request Report BCM Event;

Send Notification; and

Termination Attempt.

34. The system of claim 29 wherein said transaction statistics comprise data selected from the group consisting of:

a number of LNP queries per point code;

a number of LNP queries if the FCI bit is set on the ISUP IAM message and GAP parameter indicates "Number Translated;"

a number of LNP query failures per point code;

a ratio of LNP queries failed to LNP queries per point code; and a number of calls wherein a switches' own LRN is detected following an LNP query.

35. The system of claim 29 wherein said transaction statistics comprise data selected from the group consisting of:

a number of ISUP calls that are ported per point code;

a number of ISUP calls that are non-ported per point code;

a number of ISUP REL messages per point code for misrouted calls to a ported number;

a number of ISUP REL messages per point code for address incomplete; and a number of ISUP REL messages per point code for invalid address format.

36. The system of claim 29 wherein said transaction statistics comprise data selected from the group consisting of:

a ratio of ported ISUP calls to total ISUP calls;

a ratio of non-ported ISUP calls to total ISUP calls;

a ratio of REL messages with a "Misrouted Call to a Ported Number" cause to ported ISUP calls; and a ratio of REL messages with a "Invalid Address Format" cause to ported ISUP calls.

37. The system of claim 29 wherein said transaction statistics comprise data selected from the group consisting of:

a number of calls resulting in unallocated indication;

a number of calls resulting in "Unallocated Number" in the donor switch; and a number of calls wherein GAP parameter indicates number translated with GAP digits missing.

38. A method for monitoring the performance characteristics of a telecommunications signaling network comprising the steps:

detecting signaling messages that are routed through at least one switching component;

identifying each said detected signaling message as associated with a particular transaction;

compiling a call record for said particular transaction, wherein said call record comprises detected signaling messages associated with said particular transaction, and wherein said transaction corresponds to at least one of the following messages from the group consisting of:

associated messages that have more than one identifier; and a plurality of messages each having a same identifying code; and determining which of a plurality of monitoring units is an anchor monitor for said particular transaction.

39. The method of claim 38 wherein said determining step further comprises the steps of:

broadcasting a time-stamped signaling message to other monitoring units;

receiving time-stamped signaling messages from said other monitoring units; and comparing said broadcast time-stamped signaling messages and said received time-stamped signaling messages to determine which of said monitors detected an earliest signaling message.

40. The method of claim 38 wherein said determining step further comprises the steps of:

broadcasting a time-stamped signaling message from a first monitoring unit to other monitoring units;

waiting a predetermined period of time for said other monitoring units to broadcast corresponding signaling messages; and assigning said first monitoring unit to be said anchor unit, if said other monitoring units do not broadcast said corresponding signaling messages with said predetermined period.

41. The method of claim 40 wherein said predetermined period of time is configurable.

42. The method of claim 38 further comprising the steps of:

transferring partial call records from non-anchor monitors to said anchor monitor in order to compile a substantially complete call record for said particular call; and compiling transaction statistics from a plurality of said substantially complete call records.

43. The method of claim 42 further comprising the step of:

associating each of said detected signaling messages with a time code.

44. The method of claim 43 wherein said determining step further comprises the step of:

identifying which of said monitoring units detected a first signaling message for said particular call.

45. The method of claim 42 wherein said transaction statistics comprise:

a number of LNP queries for a certain type of call.

46. The method of claim 42 wherein said transaction statistics comprise:

a number of ported calls for a certain type of call.

47. The method of claim 42 wherein said transaction statistics comprise:

a number of non-ported calls for a certain type of call.

48. The method of claim 42 wherein said transaction statistics comprise:

a number of misrouted calls for a certain type of call.

49. The method of claim 42 wherein said transaction statistics comprise:

a ratio of ported calls to total calls.

50. The method of claim 42 wherein said transaction statistics comprise:

a ratio of non-ported calls to total calls.

51. A method of monitoring a pair of telephone switches operating in mated relationship to one another such that a plurality of call control messages pertaining to a separate communication network carrying voice or data signals of a particular call or transaction over a selected communication channel between a calling party and a called party will always pass through one or both of the pair of switches, the method comprising the steps of:

capturing the call control messages of the particular transaction with a pair of monitoring devices, wherein each monitoring device is associated with one of the pair of telephone switches;

storing the captured call control messages in a memory table in each monitoring device;

establishing the memory table in one of the monitoring devices as a primary memory table and the memory table in the other device as a secondary memory table;

truncating the captured call control messages in the secondary memory table into a subset record comprising calling party identification, called party identification and communication network link identification;

transferring the subset record to the primary memory table;

merging the subset record with the captured call control messages stored in the primary memory table that correspond to the particular transaction based on the calling party identification, called party identification and communication network link identification to thereby create a unified call record; and generating signaling network performance statistics from a plurality of said unified call records.

52. A monitoring system for use in a communications network in which call control information pertaining to a communication link carrying voice or data signals between system users pass through one or more network components, wherein said network components are geographically separated from each other, said monitoring system comprising:

processors associated with particular ones of said network components, said processors operable for receiving and temporarily storing therein call control information as said call control information passes through said associated network components, said stored calling information identifiable for a particular transaction, wherein said each of said processors comprise:

means for time stamping call control information for a particular transaction;

means for allowing said processors to identify one of said processors as an anchor processor for said particular transaction using said time-stamped information; and means for communicating, from non-anchor monitors to said anchor monitor, all stored call control information for said particular transaction, wherein said call control information comprises said voice or data signals selected from a group consisting of:

said signals having a same identifying code; and said signals having more than one identifier.

53. A monitoring system for use in a communications network in which call control information pertaining to a communication link carrying voice or data signals between system users pass through one or more network components, wherein said network components are geographically separated from each other, said monitoring system comprising:

processors associated with particular ones of said network components, said processors operable for receiving and temporarily storing therein call control information as said call control information passes through said associated network components, said stored calling information identifiable for a particular call, wherein said each of said processors comprise:

means for time stamping call control information for a particular call;

means for allowing said processors to identify one of said processors as and anchor processor for said particular call using said time-stamped information; and means for communicating, from non-anchor monitors to said anchor monitor, all stored call control information for said particular call, wherein said call control information comprises said voice or data signals selected from a group consisting of:

said signals having a same identifying code; and said signals having more than one identifier.

* * * * *